US011281659B2

(12) United States Patent
Bagdis et al.

(10) Patent No.: US 11,281,659 B2
(45) Date of Patent: Mar. 22, 2022

(54) SYSTEMS AND METHODS FOR ACCESSING FEDERATED DATA

(71) Applicant: Palantir Technologies Inc., Palo Alto, CA (US)

(72) Inventors: Jeffrey Bagdis, Arlington, VA (US); Joel Ossher, Oakton, VA (US); Julie Tibshirani, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 178 days.

(21) Appl. No.: 16/518,588

(22) Filed: Jul. 22, 2019

(65) Prior Publication Data

US 2019/0347253 A1 Nov. 14, 2019

Related U.S. Application Data

(63) Continuation of application No. 16/008,932, filed on Jun. 14, 2018, now Pat. No. 10,402,397.

(Continued)

(51) Int. Cl.
  *G06F 16/00* (2019.01)
  *G06F 16/23* (2019.01)
  *G06F 16/25* (2019.01)

(52) U.S. Cl.
  CPC ........ *G06F 16/2379* (2019.01); *G06F 16/252* (2019.01); *G06F 16/256* (2019.01)

(58) Field of Classification Search
  CPC ... G06F 16/2379; G06F 16/252; G06F 16/256
  See application file for complete search history.

(56) References Cited

U.S. PATENT DOCUMENTS

| 3,747,757 A | 7/1973 | Freis et al. |
| 4,778,219 A | 10/1988 | Wilczynski et al. |

(Continued)

OTHER PUBLICATIONS

Chen et al., "Context-Aware Mashup for Smart Mobile Devices," 2012 IEEE Asia-Pacific Services Computing Conference Year: 2012, pp. 179-186.

(Continued)

*Primary Examiner* — Tyler J Torgrimson
(74) *Attorney, Agent, or Firm* — Sheppard, Mullin, Richter & Hampton LLP (57) ABSTRACT

Systems and methods are provided that allow federated data from various source systems to be accessed and analyzed through a data analysis platform. The federated data may be stored in different formats. The data analysis platform can receive the federated data in whatever format it has been stored at its respective source system. A script can be used to generate temporary representations (or temporary objects) for the federated data by transforming the federated data. Moreover, the temporary representations or temporary objects can be further transformed into a data analysis platform-specific format. A user of data analysis platform may access and/or manipulate either the temporary representations or objects as well as the data analysis platform-specific objects. Temporary objects can be transformed automatically into corresponding platform-specific objects when necessary to provide an enhanced capability or operation on the objects.

20 Claims, 5 Drawing Sheets

Related U.S. Application Data (60) Provisional application No. 62/669,111, filed on May 9, 2018.

(56) References Cited

U.S. PATENT DOCUMENTS

| | | | |
|---|---|---|---|
| 5,859,972 A * | 1/1999 | Subramaniam | G06F 16/258 709/203 |
| 6,434,619 B1 | 8/2002 | Lim et al. | |
| 7,113,939 B2 | 9/2006 | Chou | |
| 8,112,262 B1 | 2/2012 | Michelsen | |
| 8,572,129 B1 | 10/2013 | Lee et al. | |
| 8,700,620 B1 | 4/2014 | Lieberman | |
| 8,751,466 B1 | 6/2014 | Tsay | |
| 8,954,553 B1 | 2/2015 | Colton et al. | |
| 8,976,955 B2 | 3/2015 | Liberman Ben-Ami et al. | |
| 9,348,880 B1 | 5/2016 | Kramer et al. | |
| 9,514,205 B1 | 12/2016 | Yazicioglu et al. | |
| 9,514,414 B1 | 12/2016 | Rosswog et al. | |
| 9,612,723 B1 | 4/2017 | Elliot et al. | |
| 9,710,512 B2 | 7/2017 | Foebel et al. | |
| 9,727,314 B2 | 8/2017 | Michelsen et al. | |
| 9,753,744 B1 | 9/2017 | Wells et al. | |
| 9,760,606 B1 | 9/2017 | Wilczynski et al. | |
| 9,922,108 B1 | 3/2018 | Meiklejohn et al. | |
| 10,152,306 B2 | 12/2018 | Ryan et al. | |
| 2004/0093344 A1 * | 5/2004 | Berger | G06F 16/25 |
| 2005/0172306 A1 | 8/2005 | Agarwal et al. | |
| 2006/0122982 A1 | 6/2006 | Krishnaprasad | |
| 2007/0220268 A1 | 9/2007 | Krishnaprasad | |
| 2008/0017770 A1 | 7/2008 | Friedlander | |
| 2008/0189360 A1 | 8/2008 | Kiley et al. | |
| 2008/0209451 A1 | 8/2008 | Michels et al. | |
| 2008/0313660 A1 | 12/2008 | Malik et al. | |
| 2009/0077011 A1 * | 3/2009 | Natarajan | G06F 16/24532 |
| 2009/0144319 A1 | 6/2009 | Bhagwatisingh et al. | |
| 2011/0145689 A1 | 6/2011 | Campbell et al. | |
| 2011/0196855 A1 | 8/2011 | Wablae et al. | |
| 2011/0320019 A1 | 12/2011 | Lanciani et al. | |
| 2013/0136253 A1 | 5/2013 | Liberman Ben-Ami et al. | |
| 2015/0150094 A1 | 5/2015 | Foebel et al. | |
| 2015/0254124 A1 | 9/2015 | Berg et al. | |
| 2015/0363492 A1 * | 12/2015 | Laredo | G06F 9/54 707/770 |
| 2016/0092090 A1 | 3/2016 | Stojanovic et al. | |
| 2016/0094670 A1 | 3/2016 | Garcia | |
| 2016/0112262 A1 | 4/2016 | Johnson et al. | |
| 2016/0203138 A1 | 7/2016 | Feldschuh | |
| 2016/0203453 A1 | 7/2016 | Ito et al. | |
| 2016/0275158 A1 | 9/2016 | Baset et al. | |
| 2016/0285957 A1 | 9/2016 | Haserodt et al. | |
| 2016/0334974 A1 | 11/2016 | Gray et al. | |
| 2016/0359989 A1 | 12/2016 | Aycock | |
| 2016/0378439 A1 | 12/2016 | Straub et al. | |
| 2017/0004506 A1 | 1/2017 | Steinman et al. | |
| 2017/0006135 A1 | 1/2017 | Siebel | |
| 2017/0026393 A1 | 1/2017 | Walsh | |
| 2017/0034023 A1 | 2/2017 | Nickolov et al. | |
| 2017/0046134 A1 | 2/2017 | Straub | |
| 2017/0046235 A1 | 2/2017 | Straub et al. | |
| 2017/0048215 A1 | 2/2017 | Straub | |
| 2017/0048252 A1 | 2/2017 | Straub et al. | |
| 2017/0048319 A1 | 2/2017 | Straub | |
| 2017/0048339 A1 | 2/2017 | Straub | |
| 2017/0083378 A1 | 3/2017 | Bishop et al. | |
| 2017/0083386 A1 | 3/2017 | Wing et al. | |
| 2017/0091680 A1 | 3/2017 | Rosenthal et al. | |
| 2017/0228253 A1 * | 8/2017 | Layman | G06F 11/328 |
| 2017/0262852 A1 | 9/2017 | Florimond et al. | |
| 2018/0129485 A1 | 5/2018 | Ryan et al. | |

OTHER PUBLICATIONS

Chun et al., "Context-Aware Mashup for Smart Mobile Devices," 2012 IEEE Asia-Pacific Services Computing Conference Year: 2012, pp. 179-186.

Ettridge et al., Using web-based search data to predict macroeconomic statistics, 2005, [Retrieved on Jun. 27, 2018]. Retrieved from the internet: <URL: https://dl.acm.org/citation.cfm?id=1096010> 6 pp. 87-92 (Year: 2005).

Extended European Search Report for EP Appln. No. 19173522.4 dated Sep. 9, 2019, 10 pages.

Garcia et al., "A Matchmaking Algorithm for Resource Discovery in Multi-user Settings," 2014 IEEE/WIC/ACM International Joint Conferences on Web Intelligence (WI) and Intelligent Agent Technologies (IAT) Year: 2014, vol. 3, pp. 352-359.

Lin et al., "PRADA: Prioritized Random Access with Dynamic Access Barring for MTC in 3GPP LTE-A Networks," IEEE Transactions on Vehicular Technology Year: 2014, vol. 63, Issue 5, pp. 2467-2472.

Na et al., "Design of Location-based Directory Facilitator in Context-Aware Environment," 2008 10th International Conference on Advanced Communication Technology Year: 2008, vol. 3, pp. 2107-2110.

Notice of Allowance for U.S. Appl. No. 15/364,131 dated May 8, 2017.

Notice of Allowance for U.S. Appl. No. 15/730,646 dated Aug. 7, 2018.

Official Communication for European Patent Application No. 17195027.2 dated Nov. 30, 2017.

Official Communication for U.S. Appl. No. 15/364,131 dated Feb. 7, 2017.

Official Communication for U.S. Appl. No. 15/730,646 dated Dec. 4, 2017.

Official Communication for U.S. Appl. No. 15/730,646 dated Mar. 1, 2018.

Ye et al., Design and Implementation of On-Line Hot Topic Discovery Model, 2006, [Retrieved on Jun. 27, 2018]. Retrieved from the internet: <URL: https://link.springer.com/content/pdf/10.1007%2FBF02831697.pdf> 6 pp. 21-26 (Year: 2006).

* cited by examiner

SYSTEMS AND METHODS FOR ACCESSING FEDERATED DATA

CROSS REFERENCE TO RELATED APPLICATIONS

This application is a continuation of U.S. application Ser. No. 16/008,932, filed Jun. 14, 2018, which claims the benefit under 35 U.S.C. § 119(e) of U.S. Provisional Application Ser. No. 62/669,111, filed May 9, 2018, the content of which is incorporated by reference in its entirety into the present disclosure.

TECHNICAL FIELD

This disclosure relates to approaches for system-agnostic object data integration and analysis.

DESCRIPTION OF RELATED ART

Under conventional approaches, a data platform for analyzing various data may be deployed. The data to be analyzed may be obtained from many disparate data sources or source systems, and the data platform may support an object-based data modeling framework (or object model). Importing data into the object model may require applying an ontology to data (e.g., a tabular data set) to transform the data into object data that can be ingested into the data platform. Because the data can be obtained from disparate source systems, the data must be integrated in order to allow users to retrieve data from the disparate source systems with a single query. Once ingested, a data analysis application can be used to access and interact with objects corresponding to the ingested federated data. In some instances, users may want to interact with various federated data from one or more source systems using a front-end (or web-based) analytical application. In such instances, the various federated data can be ingested into the data platform and the front-end analytical application can be configured to access and manipulate objects that correspond to that federated data in the data platform. However, in some instances, accessing and manipulating such objects from the data platform using the front-end analytical application can be difficult or costly.

SUMMARY

The present disclosure, in one embodiment, provides a system, comprising one or more processors; and a memory storing instructions that, when executed by the one or more processors, cause the system to perform: determining a script for transforming federated data in one or more source computing systems to corresponding data platform objects; determining a set of temporary objects based at least in part on execution of the script, wherein the temporary objects each provide a first representation of some portion of the federated data; determining a set of data platform objects based at least in part on execution of the script, wherein the data platform objects each provide a second representation of some portion of the federated data; and providing an interface for accessing the federated data, wherein operations performed through the interface are applied to the set of temporary objects.

In some embodiments, the set of temporary objects are cached in the memory. In some embodiments, execution of the script determines an ontology for an object-based data modeling framework of the system.

In some embodiments, each temporary object references some portion of the federated data, and wherein each temporary object has a corresponding data platform object that also references the same portion of the federated data. In some embodiments, the temporary object and the corresponding data platform object have identical properties and links. In some embodiments, modification of the portion of the federated data in the one or more source computing systems triggers an update to the corresponding data platform object that references the portion of the federated data. In some embodiments, the update is triggered in response to a search result that references the portion of the federated data, the search result being provided in response to a search query submitted through the interface. In some embodiments, promotions applied to a temporary object through the interface are automatically applied to a corresponding data platform object. In some embodiments, when the temporary object is accessed through the interface, the system obtains and provides the corresponding data platform object through the interface. In some embodiments, the system stores metadata describing the promotions applied to the temporary object.

In another embodiment, provided is a computer-implemented method, comprising: receiving federated data from one or more source computing systems into a data analysis platform; generating temporary objects, wherein the temporary objects each provide a first representation of some portion of the federated data; generating data platform objects, wherein the data platform objects each provide a second representation of some portion of the federated data; and providing an interface for accessing the federated data via the data analysis platform, wherein operations performed through the interface are applied to at least one of the temporary objects and the data platform objects.

In some embodiments, the computer-implemented method further comprises ingesting the data platform objects into a database of the data analysis platform. In some embodiments, the computer-implemented method further comprises re-ingesting the data platform objects into the database of the data analysis platform upon a change being performed on the portion federated data to which the data platform objects correspond.

In some embodiments, each of the temporary objects corresponds to each of the data platform objects, and wherein each corresponding temporary object and data platform object reference the same portion of the federated data. In some embodiments, the temporary objects and the corresponding data platform objects have identical properties and links. In some embodiments, the computer-implemented method further comprises triggering an update to the data platform objects corresponding to the portion of the federated data upon a change to the portion of the federated data at the one or more source computing systems. In some embodiments, generating the data platform objects and generating the temporary objects comprises executing a script adapted to determine a schema of the federated data.

In some embodiments, generating the data platform objects and generating the temporary objects comprises executing the script adapted to determine an ontology for an object-based data modeling framework of the data analysis platform. In some embodiments, the computer-implemented method further comprises automatically applying promotions to the data platform objects corresponding to the temporary objects upon promotions being applied to the temporary objects. In some embodiments, the computer-implemented method further comprises storing metadata describing the promotions applied to the temporary object.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Overview

A claimed solution rooted in computer technology overcomes problems specifically arising in the realm of computer technology. In various embodiments, data loaded from various source systems can be used to generate temporary representations (or temporary objects) for the data. In some embodiments, these temporary objects can be generated based on a data modeling process. For example, a computing system can access a script created using a domain-specific language. In general, the script can be executed to ingest data (e.g., source rows, documents, etc.) from one or more source systems ("federated data") into an enterprise data platform that supports an object-based data modeling framework (or object model). In some embodiments, this script can also be used to generate temporary representations (or temporary objects) for the federated data. It should be understood that federated data can refer to data originating or accessed from different data sources that may be decentralized, and where no master or central data management systems or defined standards are employed to manage the different data sources. That is, a plurality of different data sources that are self-sustained and separately functional act or appear to function as a single entity, e.g., a federated database. In some embodiments, a federated database system can map multiple autonomous and disparate databases into a single federated database. The disparate databases can be interconnected via a computer network and may be geographically decentralized. In some embodiments, there is no data integration between the disparate databases. Federated database queries can be resolved by determining which of the disparate data sources contains the data being requested, and passing the query to that particular data source.

In such embodiments, when executed, the script can determine a schema of the federated data, determine an ontology for a target object-based data modeling framework in which the federated data is to be ingested, and generate temporary objects that correspond to the federated data. In some embodiments, temporary objects for federated data can be created on-the-fly as the federated data is ingested into the data platform. Thus, in some embodiments, each temporary object created from the federated data can have a corresponding object in the data platform that references the same federated data. In some embodiments, a temporary object and its corresponding object in the data platform can be identical. For example, both the temporary object and corresponding object can include the same properties, same values for the properties, same links to other objects, and also the same access control restrictions.

In some embodiments, an interface for interacting with the federated data can be provided as a front-end (or web-based) analytical application. In such embodiments, the interface can be used to access the corresponding temporary objects that were generated for the federated data rather than the federated data as stored in the source computing systems. In some embodiments, temporary objects are cached when accessed (e.g., loaded) through the interface. In some embodiments, users can apply various promotions to the temporary objects. For example, users can add properties to a temporary object or link the temporary object to another object (e.g., another temporary object or another object that exists in the data platform). In some embodiments, any promotions applied to a temporary object are also applied to an object that corresponds to that temporary object in the data platform. In some embodiments, metadata (or information) describing such promotions can be stored. For example, the metadata can indicate which portions of an object were updated (e.g., property values, links, etc.) and a source from which that updated portion was ingested (e.g., source system, source table, source row, etc.). In some embodiments, this metadata is used to determine whether a temporary object being accessed was previously promoted in the data platform. If the temporary object was previously promoted, the interface can provide an object that corresponds to the temporary object from the data platform. As a result, the user is provided an updated version of the object that includes changes (or promotions) that may not be reflected in a source system from which the temporary object was created.

In some embodiments, any changes to federated data in a source system can trigger a re-ingest (or update) of the federated data into the data platform. For example, in some embodiments, a user may search for federated data (e.g., source rows) and be shown search results that reference federated data responsive to the user's query. In such embodiments, if federated data referenced by a search result was updated more recently in its source system that an object corresponding to the federated data in the data platform, then the federated data can be re-ingested (or updated) in the data platform. As a result, objects in the data platform can be updated in response to user search queries to which those objects are responsive. By updating the data platform in this manner, analytically relevant objects are automatically kept up to date without requiring an explicit crawl of the source system. Many variations are possible.

It should be noted that each data source or source system may store some portion or piece of data ("fragment") related to an object. For example, different types of data associated with an object may be stored at each source system. Data at each source system may be tagged with an ID that correlates the different types of data stored at each source system with the object. As used herein, the term fragment can refer to any "portion" or data subset of some object. A request, in which an object ID is specified, to access any available data associated with the object may be received from the front-end application.

Object-Based Data Structure

Before describing the systems and methods for federating data in accordance with various embodiments of the present disclosure, it is useful to describe an example object-based data structure that can be used to represent subjects/data to be analyzed by the systems and methods disclosed herein.

In some implementations, the disclosed technologies may facilitate a data transformation between a tabular data structure and an object-based data structure. Object-based data structures may provide powerful tools for generating insights about data and links between data. For example, systems may collect data in a tabular format comprising rows and columns populated with data. Transforming tabular data into object-based data may be necessary to access the insights available through an object-based data representation including, but not limited to, e.g., link maps, histograms, timeline representations, etc.

Figure 1:
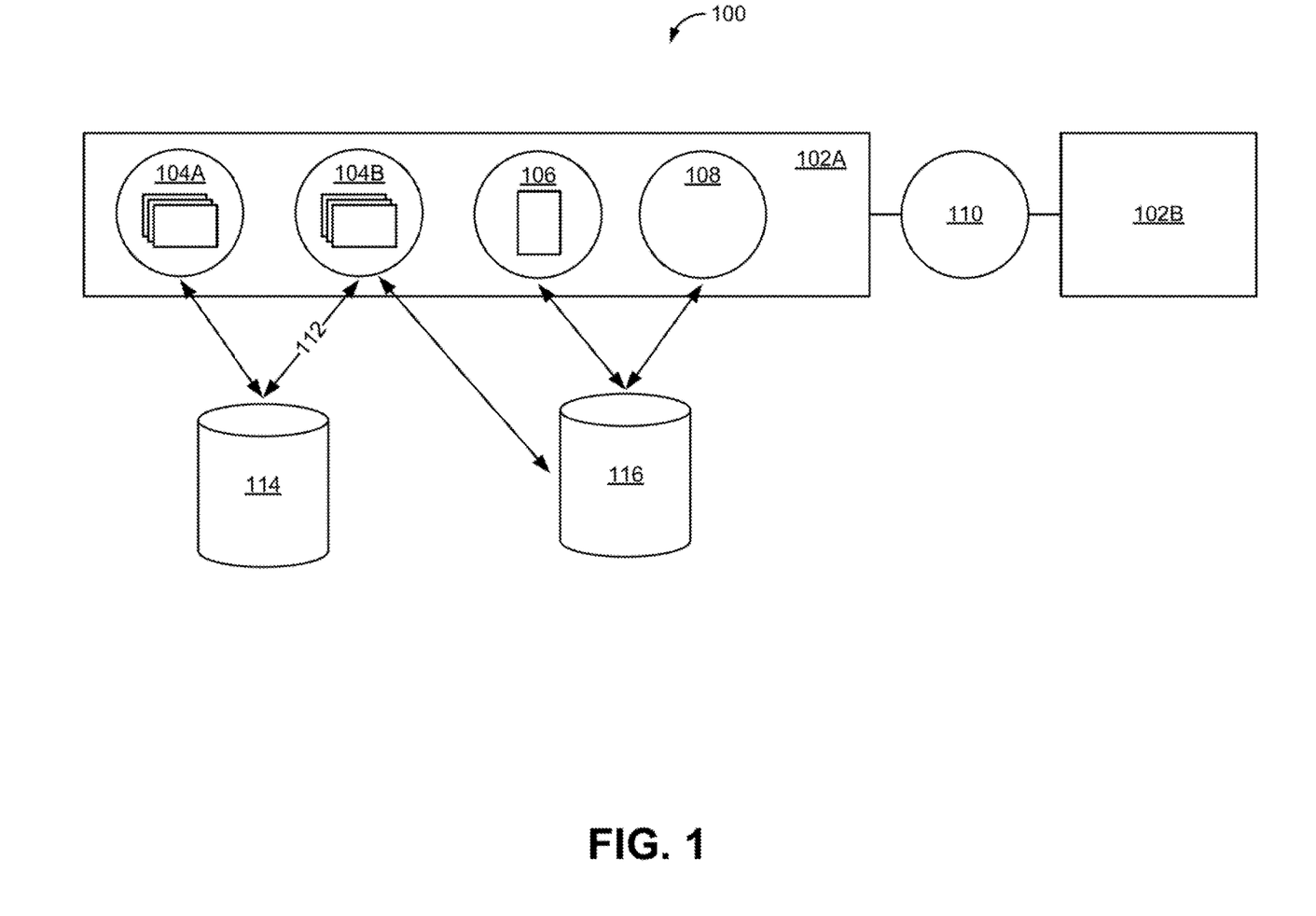
FIG. 1 illustrates an example object-based data structure.

FIG. 1 depicts an object-based data structure 100. Object-based data structure 100 can be centered around data objects, e.g., data objects 102A and 102B. Each data object 102A/102B may include several components, including one or more object properties 104A/104B, one or more data notes 106, one or more media components 108, and/or one or more data links 110. The origin of data stored in data object 102A, for example, may be stored in a source system record 112 that indicates a source system 114 of the stored data. Other components or fragments of data that make up the data object 102A, e.g., data notes 106, media components 108, etc., may originate at another source system, e.g., source system 116. It should be noted that in some embodiments, object 102A may contain properties which originate from multiple source systems (e.g., source systems 114 and 116). For example, properties may originate from one source system, e.g., source system 114, while ancillary components like media may originate from another source system, e.g., source system 116. Moreover, it is possible that the same property, with the same value, originates from multiple different source systems (possibly with different access control restrictions).

The object model is a framework for how data is stored and/or represented. The object model is further defined by an ontology, defining the types of data and how they are stored in a given system. The ontology may be dynamic, and updated to match evolving needs of the system and analysts analyzing data with the system. The ontology may define types of data objects, e.g., data objects 102A and 102B, object properties 104A/104B of a particular data object, e.g., data object 102A, and data links 110 associated with a data object, e.g., the link between data object 102A and data object 102B. The ontology may further define which data types may be associated with each other. Each data type may have a URI (uniform resource identifier) that identifies it.

Object types define the kinds of things that may be represented in the system, and provide a structure for data objects. Object types may be derived from, for example, entity types, event types, document types, and multimedia types. Event and document types may have temporal and geospatial data directly included within the data object itself. An object type may define the number and composition of properties, e.g., object properties 104A/104B, data notes 106, and media components 108 of a data object, e.g., data object 102A. The object type may further define what other types of objects that data links, e.g., data link 110, may permit association with. For example, an entity's object type may define a data object 102A used to store data about a person, and may include data properties 104A/104B for storing name, address, occupation, e-mail address, phone number, etc. Data links 110 of an entity object 102A may permit the entity object 102A to be linked to other entity objects (e.g., friends or business associates), linked to event objects (e.g., events attended or invited to), linked to document objects (e.g., authored), etc., e.g., object 102B.

Property types may define the type and behavior of input data. Property types may define the structure of the data stored in an object property, e.g., object property 104A. The property type may define one or more data fields, the type of data associated with the field, as well as tools that may operate on the data fields. Property types may be simple, including a single data field, and/or may be composite, including multiple data fields. For example, an e-mail property type may define an e-mail object property. For example, the e-mail address john@acmeinc.com may be stored in an e-mail object property as follows: URI: com.property.Email, Base Type: Composite, with these components: EMAIL_USERNAME with the value "john," EMAIL_DOMAIN with the value "acmeinc.com." Further, the e-mail property type may define tools for parsing and concatenating the username and the domain, depending on what is required.

Link types may define the types of data links, e.g., data link 110 that can exist between two objects, e.g., objects 102A and 102B. Links may be symmetric or asymmetric. All links may have one object that is considered the "parent" object, and another object deemed to be the "child." In the case of symmetric links, e.g., "Spouse Of," parent and child objects may not necessarily be contextually important. In the case of asymmetric links, like "Manager Of/Managed By," the parent and child may reflect the direction of the link.

Thus, the ontology of an object-based data system may define the way in which data is organized in the object-based data system. The ontology defines the types of objects that may be stored and the components of the defined data objects as well as the manner in which the defined data objects may link to one another via data links.

Example System for Data Transformation and Ingestion

As noted above, data analysis may involve obtaining data to analyze from more than one source system. That is, a data analysis platform may access multiple, sometimes remote datastores, data servers, etc. in order to obtain the requisite data for analysis. For example, an analyst may wish to analyze data regarding an object, e.g., a particular person of interest in an investigation. Data about and/or associated with that person of interest may reside in different source systems, and may take different forms, e.g., phone records regarding calls made to and/or by the person of interest. Data regarding that person of interest may also exist in the form of personal data, e.g., social security number (SSN) information associated with the person of interest. The phone records and personal information, although associated with the same person of interest may be stored or maintained in different data stores. In order to provide meaningful analysis, both sets of data should be made available to the analyst in a federated manner.

Conventional data platforms would generally require downloading, importing, or otherwise being provided access to the entirety of each source system in order to allow the analyst to search for each type of data. Accordingly, data analysis based on this type of data access can result in unnecessary delays. Moreover, data analysis platforms may not have the ability or capacity to handle the voluminous amounts of data that could exist in these source systems. For example, some data analysis platforms can handle hundreds of millions of objects, but still, some source systems contain amounts of data that exceed this capacity. Further still, some conventional methods of federating data involve making requests to application program interfaces (APIs) to produce data platform objects. However, this method of federating data may involve generating search and read interfaces for objects, receiving search hits, and loading those objects, where every feature of the search and object read API is built. This can be cumbersome and time-consuming as well.

Accordingly, and as alluded to above, a system-agnostic method of data ingestion and federation is provided using a script, e.g., an integration script, and a definition of an agnostic mechanism of searching for and loading source records (also referred to as origin data) in whatever format in which they may originally have been stored. As also alluded to above, a temporary or intermediate object or representation of the federated data may be generated.

Figure 2:
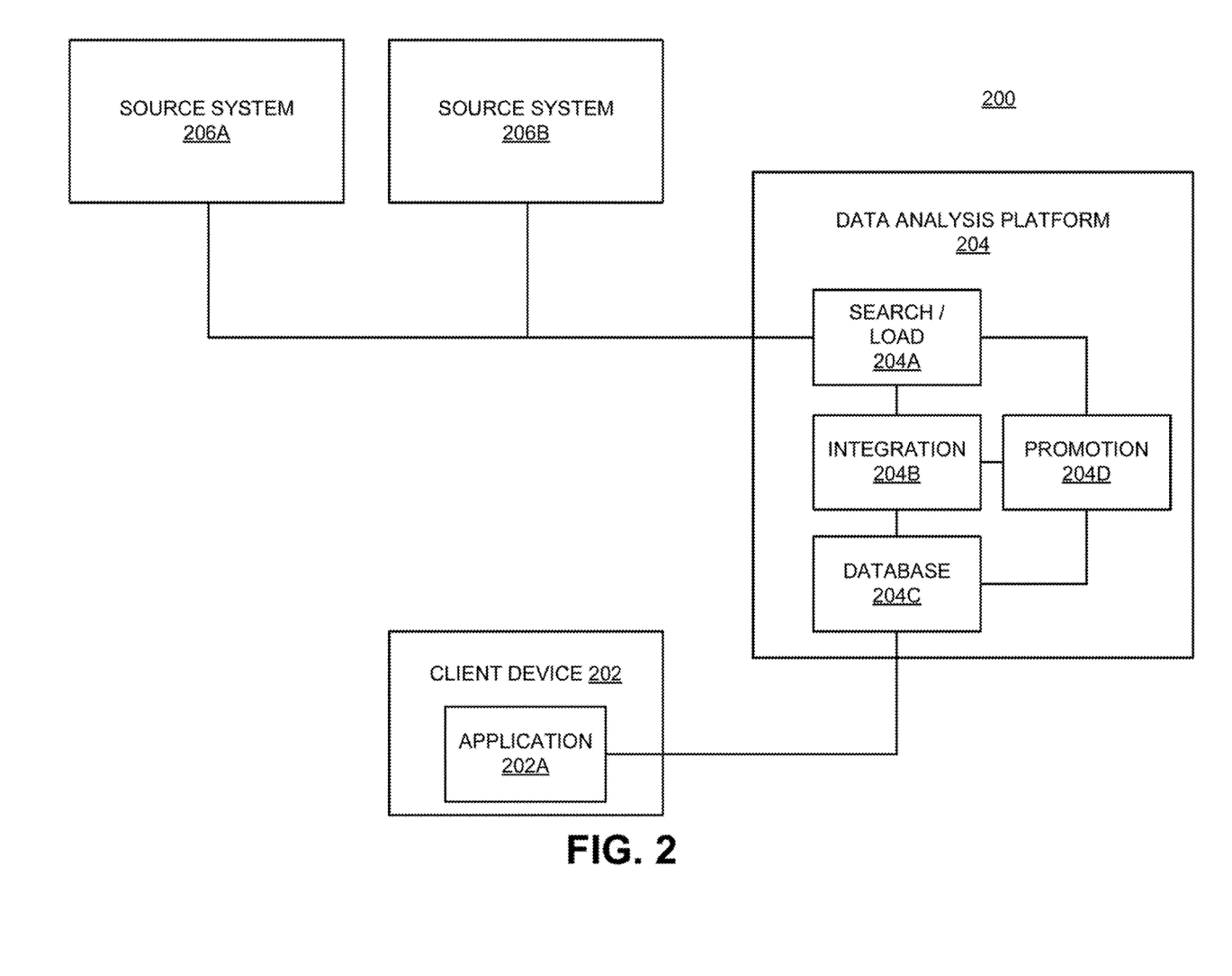
FIG. 2 illustrates a schematic representation of an example multi-data source system for federated data ingestion and transformation in accordance with one embodiment of the present disclosure.

FIG. 2 is a schematic representation of an example data analysis system 200. In data analysis system 200, a user, e.g., an analyst, may analyze data using a data analysis application 202A running or implemented on a client computing device 202. The client computing device may be any client computer such as a workstation computer, a laptop computer, a tablet computer, a mobile phone, or other client computing device that has or is operatively coupled to a display, e.g., a video/multimedia display. While only a single client computing device 202 is shown in FIG. 2, the system 200 may include more client computing devices. Any one or more of the links represented between the elements of data analysis system 100 may traverse one or more data networks (e.g., Local Area Networks and Wide Area Networks).

A network communication link may be based on a reliable network transport protocol such as TCP/IP or the like. A network communication link, e.g., between client computing device 202, data analysis platform 204, etc. may be established as and when needed, for example, when client computing device 202 and data analysis platform 204 need to send data to the other. Alternatively, a network communication link may span the life of a session during which data is sent back and forth between the system elements in multiple communication exchanges. Network communication links may traverse a number of intermediary devices (e.g., web servers, cache servers, proxy servers, content delivery network servers, etc.) not necessarily shown in FIG. 2. Communications, data exchange, etc. between any one or more of the system elements may involve standardized Web protocols (e.g., HTTP, HTTPS, etc.) and include standardized markup language instructions (e.g., XML, HTML, XHTML, etc.), standardized style sheet language instructions (e.g., CSS, etc.), and standardized client-side scripting language instructions (e.g., JavaScript®, ActionScript®, and Jscript®, etc.).

In some embodiments, the client device 202 may be a computer workstation running a web-based application 202A that is an instance of data analysis platform 204. In some embodiments, the client device 202 may be some other computing or processing device running a standalone instance of application 202A that needs to access data analysis platform 204. That is, data analysis platform 204 may have its own dataset or corpus of data that, e.g., another user analyzed, and which the user of client device 202/application 202A wishes to access and/or leverage for his/her own data analysis.

Data analysis platform 204 may be or may include a revisioning database 204C that maintains an immutable log or record of an object along with the attributes regarding those objects. Any addition, modification, or deletion of an attribute associated with an object can be recorded, along with data regarding the use that added, modified, or deleted the attribute, the security level of that user, where the data is sourced to, tags, metadata, etc. Data analysis platform 204 may also provide various forms of analytical functions, such as filtering, visualizing, mapping, sharing, controlling access to data, etc. Thus, an analyst, by way of application 202A may wish to access and/or use data analysis platform 204 for its functionality and/or to obtain access to data generated and stored therein.

Data analysis platform 204 may further include a search/load component 204A, an integration component 204B, and a promotion component 204D. As will be described in greater detail below, search/load component 204A may provide search functionality for application 202A, as well as handle the receipt and loading of data from data sources associated with source systems 206A and/or 206B into data analysis platform 204. Integration component 204B may transform that data into temporary or intermediate object data for use by application 202A, as well as facilitate ingestion of the data into database 204C. Promotion component 204D may facilitate the selection of federated data that, when integrated into data analysis platform 204, can be used/manipulated. The aforementioned script may embody the respective functionalities of search/load component 204A, integration component 204B, and promotion component 204D.

Data analysis platform 204, as illustrated in FIG. 2, further connects to two source systems, source systems 206A and 206B. Following the above example, source system 206A may be a database containing phone records for a particular region, carrier, etc. Source system 206A may be a data repository associated with a particular information provider or other entity in possession of phone records data. Source system 206B may be a database containing personal records associated with persons residing/thought to reside in a particular region. Source system 206B may be a data containing personal records associated with an information provider having a need or the authority to maintain personal records regarding certain persons.

It should be understood that data analysis platform 204 may connect to more than two source systems, or may connect to a single source system, as needed/desired. The size and/or number of source systems connected to data analysis platform 204 can change depending on the subject(s) of interest and/or the analysis needs of a particular analyst. For example, one analyst may choose to limit his/her search for a subject of interest to a particular number/type of source systems, while another analyst may choose to analyze data that may fragmented across many more source systems. As another example, the same analyst, may, depending on the needs of his/her search may seek to access data stored in more, less, and/or other source systems.

Here, source system 206A and source system 206B may both contain data associated with an object, i.e., the aforementioned person of interest. It may be that source systems 206A and 206B have data tagged or associated with "external" IDs that match. For example, source system 206A may be a phone records database that has a record of call and data/point regarding the person of interest, while source system 206B may be a personal records database that has personal records regarding the same person of interest. Source systems 206A and 206B may have their respective data tagged with an ID, such as the person's name, resulting in the aforementioned match. In some cases, source systems 206A and 206B may have data tagged or associated with an ID that comprises the data stored in the other source system. For example, source system 206A may have records tagged with a callee's phone number, while source system 206B has, as part of the personal records associated with the person of interest, his/her phone number. If data is being "pushed" to data analysis platform 204, data analysis platform may be able to run an integration to join the phone records and personal records data. That is, metadata from both can be emitted from source systems 206A and 206B, respectively, and used to join the two types of object data to arrive at single canonical "person" object that has, e.g., phone call information associated with it. It should be noted that each unit of data may comprise a source row, e.g., a single file or document, in a source system. If an analyst using application 202A wishes to find data associated with the person of interest, the data (or data fragments) should be identified and joined.

It should be noted that a reference to a federated version of an object (e.g., an object loaded on the fly) may include both its external ID as well as its source system row ID without necessarily needing persistence. However, the external ID refers to a data analysis platform-specific object that it becomes a part of. Accordingly, regardless of whether a user, e.g., a user of application 202A edits a temporary object or the data analysis platform-specific object, the edits become part of same object. When accessing or analyzing the data analysis platform-specific object, it may be properly represented as a federated object sourced from different rows of a source system or different source systems. When accessing or analyzing the temporary object, a "single source system" view of the object may be presented.

Search/load component 204A may be used by application 202A to search for relevant data/data of interest amongst federated data originating from source system 206A and/or source system 206B. Moreover, search/load component 204A may operate as an interface for source systems 206A/206B for receiving data into data analysis platform 204. The data may be loaded in its original format, i.e., the format in which it was stored at source system(s) 206A/206B.

Upon being loaded into data analysis platform 204, the data may be integrated into data analysis platform 204 via integration component 204B. Integration component 204B may generate object fragments with any associated properties and/or links between the object fragments to form, what can be referred to as an object bundle or chunk. Moreover, integration component 204B may convert or transform the object fragments into a temporary object. A first representation of the temporary object can be presented to a user of application 202A. Additionally still, a second representation commensurate with a representation specific to data analysis platform 204 can be generated, and subsequently ingested into data platform 204. That is, the object fragments can be transformed into a format as if the data from source systems 206A and/or 206B were ingested directly into data analysis platform 204 vis-à-vis database 204C. In some embodiments a representation of a newly ingested object can be created, whereas in other embodiments, the object fragments, once transformed, can be added to existing objects of data analysis platform 204 (and stored in database 204C).

It should be noted that the above-mentioned object bundle need not be persisted in the long term. However, object bundles may be cached, e.g., in database 204C. In this way, if a user refreshes application 202A (e.g., a web browser-based application), or if multiple client devices 202 load and/or search for the same object(s), the common object bundle can be transformed into the requisite representation to be presented to application 202A, multiple ones of client device 202, etc.

Within an integration, links may be created between objects within an object bundle, wherein the objects and link(s) may be sourced to same source document, file, etc. However, links can also be created to another federated object regardless of whether the other federated object exists in same or different source system. In this way, source row information (e.g., a reflected in metadata) can be specified when creating a link, and links can be preemptively displayed even if the link has not yet been promoted (discussed in greater detail below).

In some embodiments, integration component 204B may transform data from a source system, e.g., if the data is in some tabular format (which is common), into an object-based data structure that can be more readily analyzed and/or allow for more/better ways to consume the data. It should be noted that integration component 204B may utilize the same or similar data modeling logic and domain-specific languages that may be used by data analysis platform 204 when directly ingesting data. Moreover, the same or similar data modeling logic can be utilized for on-the-fly federated data transformation.

Consider, for example, an analyst performing a search for an object that is associated with one or more data fragments stored in source system 206A. Prior to reaching client device 202/application 202A, the one or more data fragments, at read/write time, can be transformed if needed, into an object-based data structure. The details of data transformation functionality of integration component 204B is discussed in greater detail below.

It should be noted that transforming a data fragment from tabular form to an object-based data structure is only one example of a transformation contemplated in accordance with various embodiments. That is, integration component 204B can be configured to perform any requisite transformations, if needed, to achieve the data format needed by application 202A and/or data analysis platform 204. It should also be noted that in some embodiments, e.g., when application 202A is accessing or is running as an instance of data analysis platform 204, data analysis platform 204 may ingest the one or more data fragments (post-transformation if needed). The resulting objects may then be used by application 202A.

Once the requisite data fragments are obtained, e.g., from source systems 206A and 206B, in order to achieve the aforementioned canonical view of the object, the data fragments are joined. In data analysis platform 204, this joining of data fragments can be performed by integration component 204B. The joining of data fragments can include, in some embodiments, the association of the aforementioned external ID with those data fragments in each source system from which the data fragments originated. For example, in a search for a person of interest, unique data about each person (e.g., person handle="ash," unique ID="778") can be used for generating an external ID that can be associated with each data fragment found/identified from, e.g., source system 206A and source system 206B (e.g. "ash778").

In operation, an analyst may find relevant information regarding the person of interest, and the analyst can create and send a link to this information to another analyst, e.g., http://system/obj/ash778. This may be "placed" by the other analyst on a map visualization generated using data analysis platform 204, or the other analyst may simply access the link to view the information. Upon accessing the link, a search for all information regarding ash778 is performed by querying source systems 206A/206B and/or data analysis platform 204 to determine if any fragments exist. Integration component 204B can transform any identified fragments, may join the fragments, and the object can be sent to this other analyst. In some embodiments, the use of caches (e.g., at source systems that have/are predicted to be more frequently queries) response time/query results can be obtained more quickly. That is, if source system 206B is identified to be such a source system, a cache can be used to pre-load (smart versioned) fragments associated with the object ash778 to be sent each time a query for that object is initiated. In some embodiments, database 204C may also be configured have a cache layer or partition that can mirror the functionality of those caches implemented in/associated with source systems 206A/206B. In other embodiments, data analysis platform 204 may also maintain tables, for example, that track which data fragments are associated with which object and their origin, e.g., which source system they originated from.

It should also be noted that if an analyst wants to search a particular source system, e.g., source system 206A for particular data, an option can be given to search for other fragments in other source systems, e.g., source system 206B. For example, search results may include phone records with additional information, e.g., a full object or object graph presented nearby.

Example Method for Data Transformation and Ingestion

Figure 3:
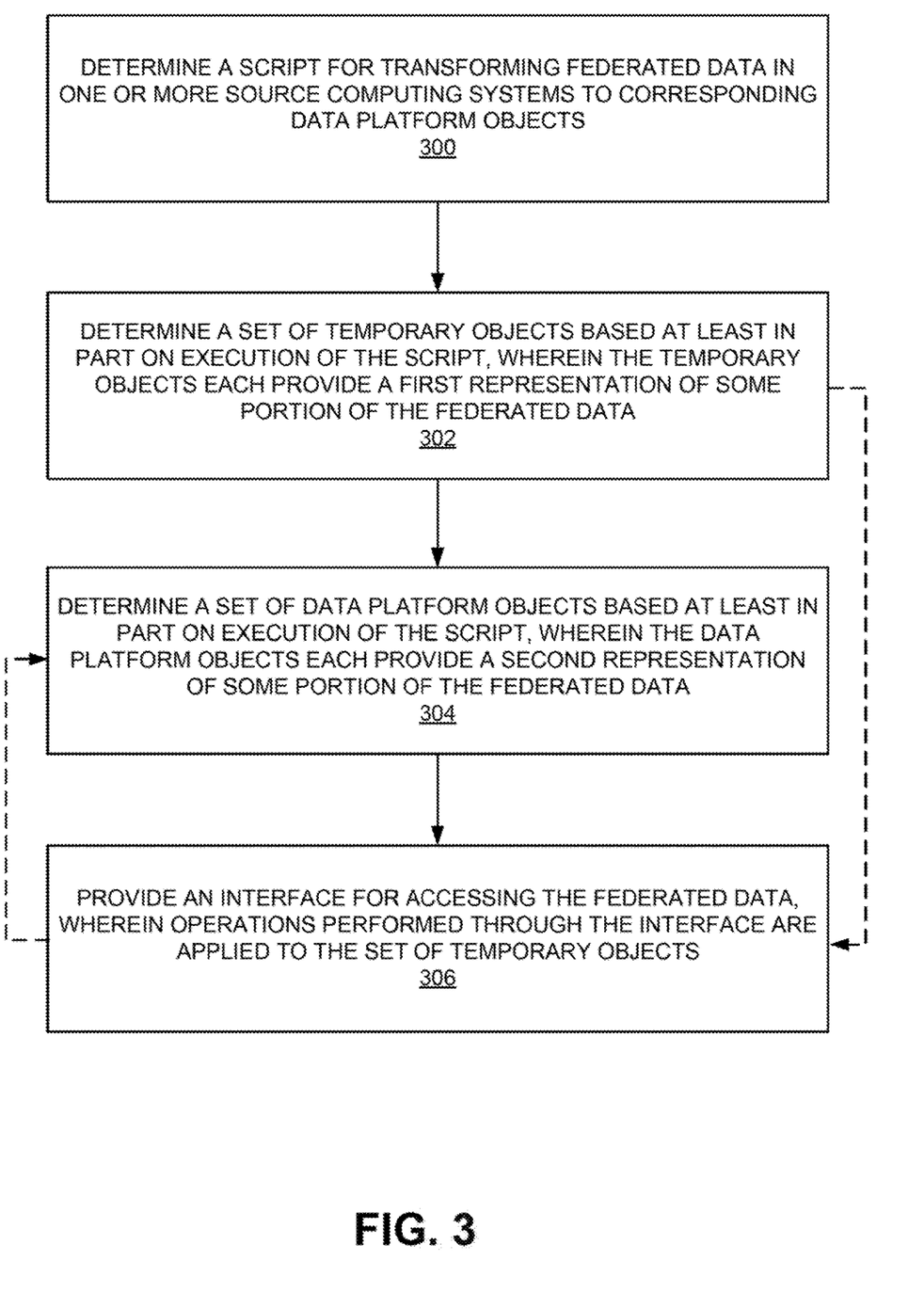
FIG. 3 is a flow chart of example operations that can be performed for achieving the federated data ingestion and transformation in the system of FIG. 2.

FIG. 3 is a flow chart of example operations that can be performed for ingesting and transforming federated data in the system of FIG. 2. At operation 300, a script for transforming federated data in one or more source computing systems to corresponding data platform objects, e.g., temporary or intermediate objects, is determined. For example, an analyst using application 202A may initiate a query for a particular object of interest using some identifier or ID value. A search for that ID value or identifier can be performed through source systems 206A and/or 206B. The script can be used to transform the federated data. In some embodiments, determining a script can comprise selecting an existing script written in advance of its invocation on any specific source objects. In other embodiments, determining a script can be a dynamic operation. That is, it is possible for a scripts logic to depend on aspects of a source system that can be determined differently each time the script is invoked. For example, if the source system's schema changes from time to time, and the source system provides a mechanism (e.g., an API) for fetching a description of its current schema, the integration script can adjust its logic to correspond to the schema of the source system as it exists on each invocation.

For example, as described herein, the query can be initiated, and an appropriate query may be generated commensurate with the data stored in source systems 206A and 206B, respectively, and/or commensurate with the type of source systems 206A and 206B may be. Thereafter, the queries can be executed on source systems 206A/206B and/or the query can be applied to data maintained within data analysis platform 204. In some embodiments, one or more of these elements may employ caches that may have the requisite data fragments pre-identified/stored therein to allow for faster query response time. Moreover, the caches may keep updated versions of the data fragments.

In some embodiments, upon retrieval of two or more data fragments, the two or more data fragments are joined to create a canonical view of the object. For example, integration component 204B may join the data fragments by associating the data fragments to the object vis-à-vis an external ID.

At operation 302, a set of temporary objects based at least in part on execution of the script can be determined or generated. The temporary objects each provide a first representation of some portion of the federated data. It should be noted that user interaction with the temporary objects (as in operation 306) can occur prior to actual ingestion of the federated data represented by the temporary objects in database 204C of data analysis platform 204.

At operation 304, a set of data platform objects based at least in part on execution of the script can be determined or generated. The data platform objects each provide a second representation of some portion of the federated data. That is, if the temporary objects are ultimately ingested into database 204C of data analysis platform 204, the federated data can be represented in accordance with a format specific to data analysis platform 204.

At operation 306, an interface for accessing the federated data is provided. Operations performed through the interface are applied to the set of temporary objects and/or the data platform objects. For example, in some embodiments, the analyst, via an interface provided through application 202A, may access and analyze, edit, or otherwise manipulate the temporary objects and/or the federated data vis-à-vis the data platform objects/second representation thereof. It should be noted that in some embodiments, data analysis platform 204 can operate directly on temporary objects (without knowing that they are temporary objects distinguishable from data platform objects). That is, operation 304 may be bypassed. In some embodiments, actions taken by a user in operation 306 can result in operation 304 being triggered, i.e., data promotion.

Data Transformation

A data-analysis platform, such as data analysis platform 204, may support an object-based data modeling framework, as described above. As also described above, data is frequently collected in a tabular format. Importing tabular formatted data into an object-based data modeling platform may require applying the ontology of the object-based data platform to a tabular dataset to transform the tabular dataset into data that conforms as required for the object-based data modeling platform.

The ontology of the object based data system may define the way in which data is organized in the object based data system. The ontology defines the types of objects that may be stored and the components of the defined data objects as well as the manner in which the defined data objects may link to one another via data links 110 (see FIG. 1).

Figure 4:
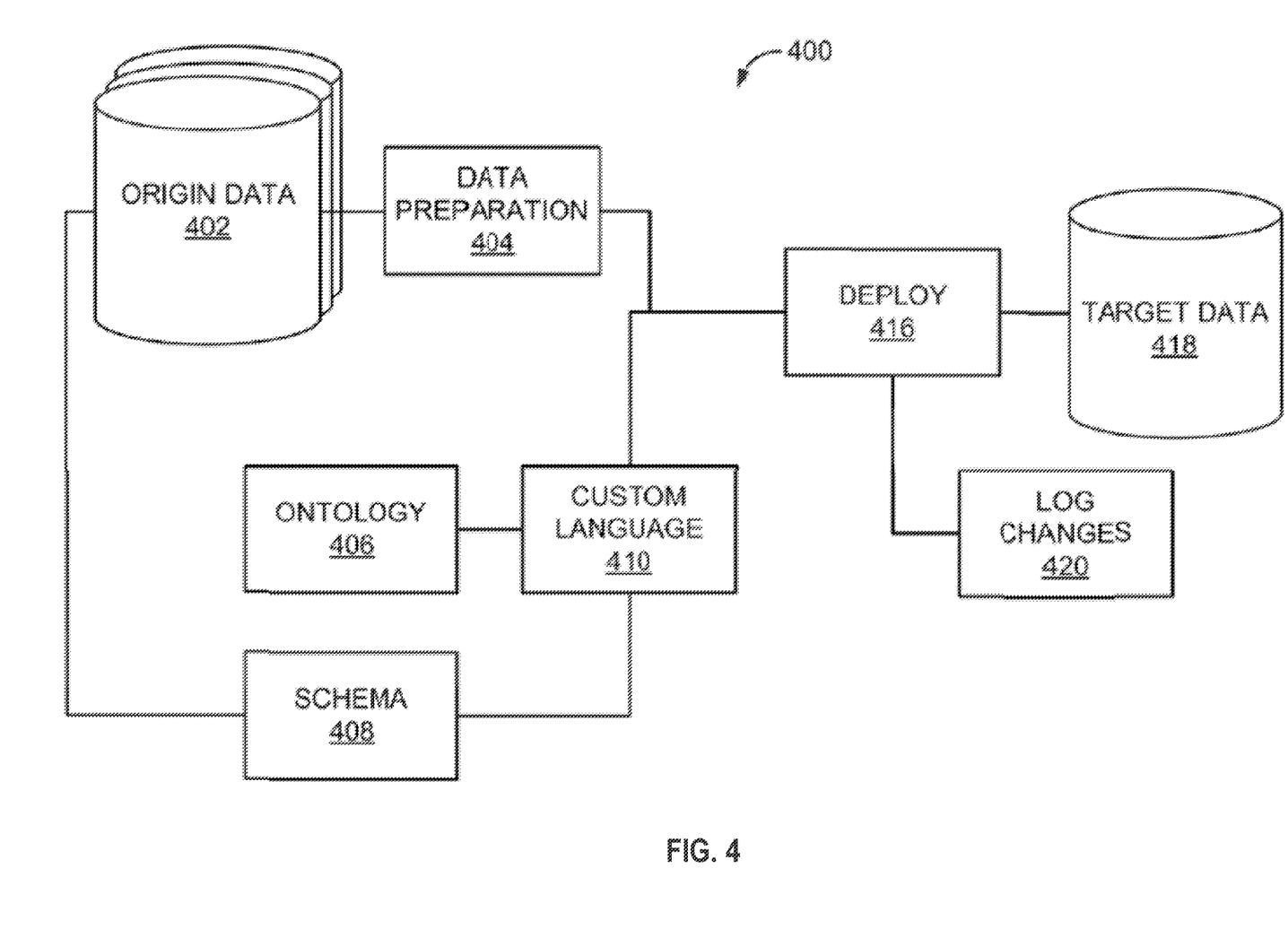
FIG. 4 illustrates an example process for data transformation in accordance with one embodiment of the present disclosure.

FIG. 4 depicts a process flow 400 of a data transformation process, according to some embodiments, that can be implemented in integration component 204B of FIG. 2. In the example illustrated in FIG. 4, origin dataset 402 is transformed into target dataset 418. Origin dataset 402 may comprise federated data stored in one or more source systems, e.g., sources systems 206A and 206B. Target data may comprise the temporary objects upon transforming the federated data and/or data analysis platform-specific data upon ingestion into data analysis platform 204.

Origin dataset 402 may be organized according to an origin data schema 408. Origin data schema 408 may specify a tabular format for data of the origin dataset 402. All or a portion of a dataset stored in a tabular data module as well as the origin data schema 408 can be received for transformation. The received origin data may be stored in a local or temporary memory for action by the system. In some implementations, receiving the origin dataset 402 may include obtaining access to the origin dataset 402 in its permanent location. Origin dataset 402 may be viewed, analyzed, processed, and otherwise interacted with via a tabular data editor in a data preparation process at 404. In some implementations, a tabular data editor may be employed to clean or otherwise normalize origin dataset 402.

Target dataset ontology 406 and origin data schema 408 may be processed to generate a custom transform language during a custom transform language generation process 410. The target dataset ontology 406 may define the data objects and relations between data objects of an object based dataset. Target dataset ontology 406 may be accessed pursuant to a request, obtained, and/or otherwise acquired, e.g., from an object-based data module or in another location. All or only a portion of the ontological details defining an object-based dataset may be received/accessed. Custom transform language generation process 410 may further create a transform script template and supply the script template to a transform code editor. The cleaned origin dataset may be received by a code editor for authoring code in the custom transform language at transform script generation process 412. A user may employ the transform code editor to enter instructions in the custom transform language. The custom transform language may be specific to data analysis platform 204.

During the creation of a transform script, the transform code editor may provide several features to facilitate the generation of a transform script. In some implementations, type checking and/or error checking may be provided. As a user enters code into the transform code editor, the entered code may be checked against the origin data schema and the target dataset ontology to ensure that references to the data of the origin dataset and the target dataset ontology are entered correctly. For example, entered code may be spell checked against the origin data schema and the target dataset ontology. In another example, entered code may be type checked, e.g., to ensure that the code entered for the transform script does not attempt to store data of one type in a data field that expects a different type, simultaneous with code entry. Should a user enter transform code that violates the type system of the origin data schema and target data ontology, the entered code may be identified through highlighting, underlining, strike-through, bolding, or other action. In another example, the existence of origin data fields and target data fields may be verified during code entry. For example, if a user attempts to write transform code intended to transform data from a non-existent column of the origin data schema, the entered code may be identified as it is entered.

After completion of the transform script, the user may choose to deploy (i.e., provisioned or "set up" for operation in the case of federated data integration) the completed script across all or a portion of the origin dataset 402 at deployment process 416. That is, scripts in the federated data integration context are not "run" on a source dataset in whole or in part until some user action results in a request to search/load some source data. The completed transform script may be deployed across the origin dataset 402 according to user selection of origin dataset 402 portions, according to updates to origin dataset 402, according to updates to the transform script, and/or any other suitable criteria. Deployment of the transform script may provide updates to target dataset 418. In some implementations, the entirety of a target dataset 418 may be generated according to the deployment of the transform script. In some implementations, target dataset 418 may be updated, modified, added to, subtracted from, or otherwise altered according to the transform script.

Deployment of the transform script may also be accompanied by the storage of data transformation information. Data transformation information may be stored with or in association with origin dataset 402 and target dataset 418. When stored with or in association with data objects of target dataset 418, data transformation information may include any or all of a time and date, a transform script version number, transform script code used to produce the data objects associated with the data transformation information, errors occurring during the transformation, and any additional information generated during the transformation. In some embodiments, changes may be logged at 420. That is, data transform information that includes information about, e.g., a version of compiled transform instructions used for transforming a specific portion of data and a corresponding date, can be stored. This can be used for error checking as well as determining which portion(s) of a dataset may need updating.

It should be noted that selections of origin dataset 402 to be transformed may be selected according to data transformation information stored about previous data transformations, for example, transformation times and dates, and transform scripts used to execute the transforms.

Data Promotion

In some embodiments, data may be loaded on the fly from a source system, e.g., source systems 206A/206B. The data, once loaded, may be seamlessly copied into data analysis platform 204 allowing users to edit (e.g., write type edits) data, make updates to it, manipulate in other ways that they wouldn't have the ability to do in the source system, e.g., adding properties, linking to other objects in data analysis platform 204, etc. Rather than converting and ingesting all data in a source system, data needed for an operation may be promoted, i.e., selected, transformed as described above, and used as if they were "fully-featured" objects of data analysis platform 204 when needed (e.g., copy on write behavior). Data promotion in accordance with various embodiments allows for application 202A to be built so that all federated data exposed through data analysis platform 204 looks and feels as though it was ingested in data analysis platform 204 by only loading pieces at the time a user chooses to perform an operation that requires a copy of the federated data to be persisted (e.g., updates, writes, etc.).

When a user, e.g., a user of application 202A, performs an operation involving data promotion, source system 206A/206B need not be accessed. For example the aforementioned representation of a temporary object may be cached, and ingestion into data analysis platform 204 can be triggered.

For example, a user may interact with application 202A to search for and load objects through data analysis platform 204. However, it may be the case that once an object is ingested into data analysis platform 204, there may have been local edits to that object made by same or other user(s), where there may be a reason to present both versions of the object. Accordingly, metadata may be stored during the ingestion of the object into data analysis platform 204. The metadata can include data reflecting which source system (206A/206B for example) and which row therein, the data fragments/objects came from. Whenever a user loads the object from a particular row of a source system again, the metadata (reflected in an index) can be checked to see if data stored in that row was ever previously promoted to data analysis platform 204. If so, the load request can be intercepted, and a data analysis platform-specific version of the object can be loaded and returned along with any user edits made on data analysis platform 204. After promotion, the data analysis platform-specific version of object can be substituted for the source system object, which may start out identical to the source system version of the object when the user of application 202A requests the source system object.

In addition to the above, certain workspace components of data analysis platform 204 may operate using data analysis platform-specific objects (rather than the aforementioned temporary objects). Accordingly, in some embodiments, a seamless drag and drop functionality between such workspace components and other applications by performing a behind-the-scenes promotion when a user wishes to access data sourced to a federated object and start interacting it with using, e.g., a legacy application.

Further still, situations may arise when data changes in a source system, e.g., source system(s) 206A/206B, occur for objects that have already been promoted into data analysis system 204. In this case, upon an object being loaded into data analysis platform 204 (described above), a check can be performed to determine if the object has already been promoted. For example, during a search or object load step (performed by search/load component 204A), all search results can be received, and a check can be performed to determine if any references refer to objects that have been previously promoted. In some embodiments, if the search results indicate some operation was performed subsequent to promotion, an update of the object can be triggered. In some embodiments, updates can be queued or updates can be performed as needed prior to presenting the object to the user. In this way, "crawling" or checking a source system (even though possible), is not necessary, thereby reducing processing overhead.

It should be noted that a data analysis platform-specific representation of an object can be optimized for long term storage with the proper fidelity and source system information associated with the object. For example, a data analysis platform-specific object can be stored (as previously noted) with all of its associated properties including access control list (ACL) properties. In this way, the object may be redacted to contain only those properties a requesting user is allowed to access during his/her current session. In other words, a representation of the data analysis platform-specific object can be generated that only contains information allowed to be viewed/accessed by a particular user, i.e., a subset of the data analysis platform-specific object. That said, all properties are properly referenced back to the data analysis platform-specific object. Thus, if a user wishes to change some property, e.g., a value name, the correct property can be updated.

Moreover, when a user wishes to access some federated data, the appropriate source system from which the federated data originates can be accessed with the proper user service level credentials. For example, the search/load component 204A may break down an object into its component fragments associated with an ACL. Prior to transforming the federated data into a temporary object, redaction can be applied the appropriate level commensurate with the user requesting the federated data. As noted above, the temporary object may be cached so that upon promotion, the entirety of the temporary object may be ingested into data analysis platform 204 with the proper ACL(s) attached. In some embodiments, the relevant ACL(s) may be obtained from the source system from which the federated data originates.

Serving an Application From Multiple Source Systems

As previously noted, data that is to be analyzed can come from different source systems. Data analysis platform 204 may also be configured to implement various modularized services through which operations for accessing and manipulating data can be performed. Such operations can allow for querying data as well as accessing and manipulating object graphs. Data analysis platform 204 may also be configured to implement various plugins that extend its functionality. One example plugin can allow data analysis platform 204 to access and ingest new source systems on which various operations will be performed. In one example, data analysis platform 204 may be implemented as a web server. Users can develop web applications that can run on the web server and can utilize the various integrations that have been configured through the web server. In another example, a plugin (e.g., an embedded web server) that implements some, or all, of the features of the web server can be installed in a workspace client. In this example, any web applications that were developed can be executed on the stand-alone workspace client.

Source systems 206A/206B may include one or more services provided to users for viewing, creating, and/or editing data stored therein. Services provided by source systems 206A/206B may allow for users to expose data stored in source systems 206A/206B.

As non-limiting examples, services may include data read, data write, data search, data tag, data promotion, and/or other services. Data read services may enable data analysis platform, 204 and/or a source system 206A/206B to read one or more data stored in source systems. Data write services may enable data analysis platform 204, and/or a source system 206A/206B to write one or more data (new or edited) to the source system 206A/206B. Data search services may enable data analysis platform 204, and/or a source system 206A/206B to find particular data therein. Data tag services may enable data analysis platform 204, and/or a source system 206A/206B to tag data with categorization information (e.g., classify certain data/segregate data into folder). Data promotion services may enable data analysis platform 204, and/or a source system 206A/206B to move data from the source system 206A/206B to data analysis platform 204.

Example Computer System

Figure 5:
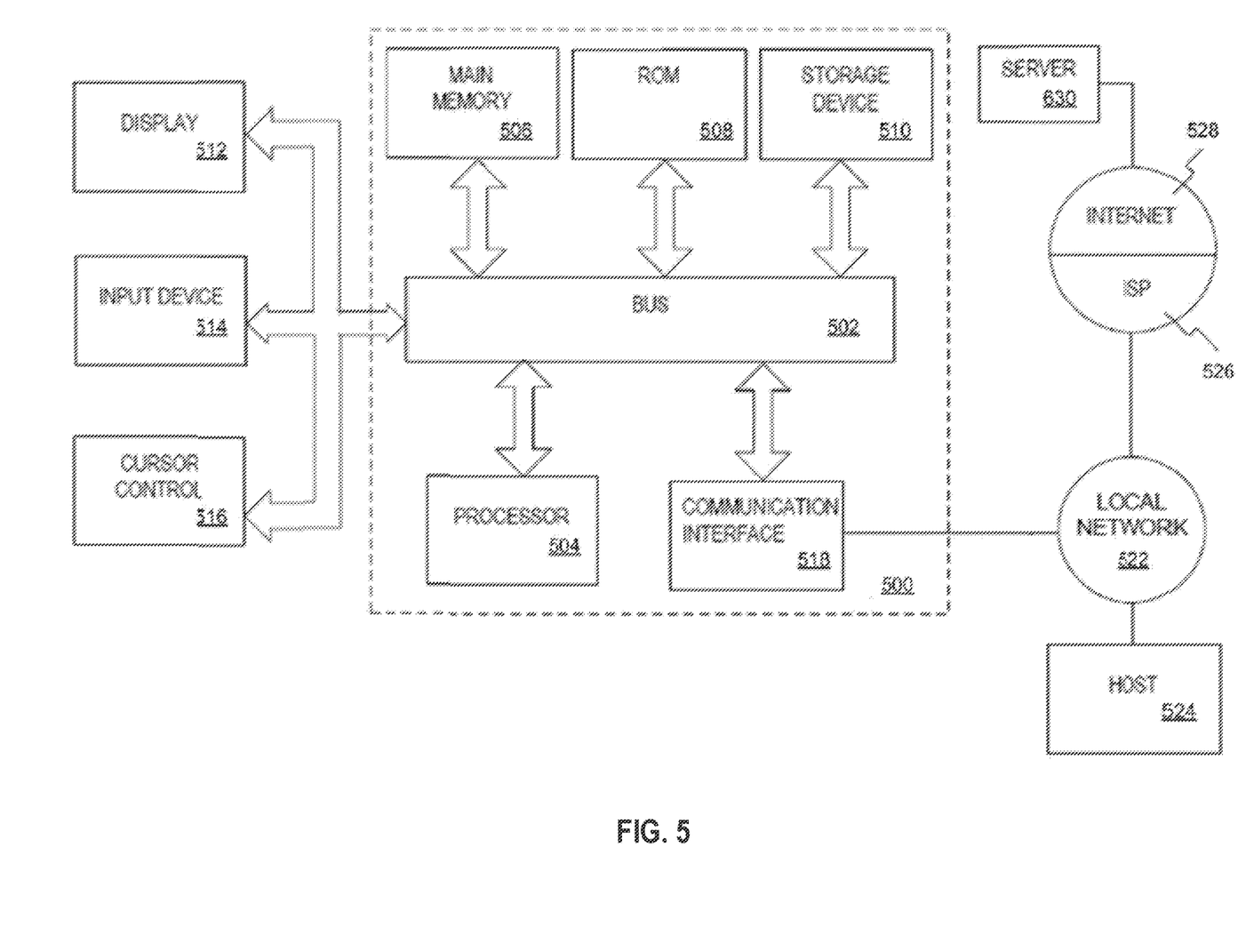
FIG. 5 illustrates a schematic representation of an example computer system in which any of the implementations described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Network interface 518 provides a two-way data communication coupling to one or more network links 520 that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link 520 typically provides data communication through one or more networks to other data devices. For example, a network link 520 may provide a connection through local network 522 to a host computer 524 or to data equipment operated by an Internet Service Provider (ISP) 526. The ISP 526 in turn provides data communication services through the world wide packet data communication network now commonly referred to as the "Internet" 528. Local network 522 and Internet 526 both use electrical, electromagnetic or optical signals that carry digital data streams. The signals through the various networks and the signals on network link 520 and through communication interface 518, which carry the digital data to and from computer system 500, are example forms of transmission media.

The computer system 500 can send messages and receive data, including program code, through the network(s), network link 520 and communication interface 518. In the Internet example, a server 530 might transmit a requested code for an application program through the Internet 526, the ISP 526, the local network 522, and the communication interface 518.

The received code may be executed by processor 504 as it is received, and/or stored in storage device 510, or other non-volatile storage for later execution. In some embodiments, server 530 can provide information for being displayed on a display.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system, comprising:
one or more processors; and
a memory storing instructions that, when executed by the one or more processors, cause the system to perform:
executing a script for transforming federated data in one or more source computing systems to corresponding data platform objects;
generating a set of temporary objects based at least in part on the execution of the script, wherein the temporary objects each provide a first representation of some portion of the federated data;
generating a set of data platform objects based at least in part on the execution of the script, wherein the data platform objects each provide a second representation of some portion of the federated data;
providing an interface for accessing the federated data;
receiving a request, through the interface, to edit a subset of the set of temporary objects; and
modifying the subset in accordance with the request.

2. The system of claim 1, wherein the set of temporary objects is cached in the memory.

3. The system of claim 1, wherein the execution of the script comprises determining an ontology for an object-based data modeling framework of the system.

4. The system of claim 1, wherein each temporary object references a portion of the federated data, and wherein each temporary object comprises a corresponding data platform object that also references the portion of the federated data.

5. The system of claim 4, wherein the temporary object and the corresponding data platform object comprise identical properties and links.

6. The system of claim 4, wherein the instructions further cause the system to perform:
modifying the portion of the federated data in the one or more source computing systems to trigger an update to the corresponding data platform object that references the portion of the federated data.

7. The system of claim 6, wherein the instructions further cause the system to perform:
in response to providing the interface for accessing the federated data, receiving a search query submitted via the interface; and
generating a search result that references the portion of the federated data, wherein the update is triggered in response to the search result.

8. The system of claim 1, wherein the instructions further cause the system to perform:
in response to providing the interface for accessing the federated data, receiving a request to apply a promotion to a temporary object through the interface; and
automatically applying a corresponding promotion to a corresponding data platform object.

9. The system of claim 8, wherein the instructions further cause the system to perform:
in response to providing the interface for accessing the federated data, receiving a request to access the temporary object via the interface; and
obtaining and providing the corresponding data platform object through the interface.

10. The system of claim 8, wherein the instructions further cause the system to perform:
storing metadata describing the promotion applied to the temporary object.

11. A computer-implemented method, comprising:
receiving federated data from one or more source computing systems into a data analysis platform;
executing a script for transforming the federated data to corresponding data platform objects;
generating temporary objects based at least in part on the execution of the script, wherein the temporary objects each provide a first representation of some portion of the federated data;
generating data platform objects based at least in part on the execution of the script, wherein the data platform objects each provide a second representation of some portion of the federated data;
providing an interface for accessing the federated data via the data analysis platform; receiving a request, through the interface, to edit a subset of temporary objects; and
modifying the subset in accordance with the request.

12. The computer-implemented method of claim 11, further comprising ingesting the data platform objects into a database of the data analysis platform.

13. The computer-implemented method of claim 12, further comprising re-ingesting the data platform objects into the database of the data analysis platform upon a change being performed on the portion of the federated data to which the data platform objects correspond.

14. The computer-implemented method of claim 11, wherein each of the temporary objects corresponds to each of the data platform objects, and wherein each corresponding temporary object and data platform object reference the same portion of the federated data.

15. The computer-implemented method of claim 14, wherein the temporary objects and the corresponding data platform objects have identical properties and links.

16. The computer-implemented method of claim 11, further comprising triggering an update to the data platform objects corresponding to the portion of the federated data upon a change to the portion of the federated data at the one or more source computing systems.

17. The computer-implemented method of claim 11, wherein generating the data platform objects and generating the temporary objects comprises executing a script adapted to determine a schema of the federated data.

18. The computer implemented method of claim 17, wherein generating the data platform objects and generating the temporary objects comprises executing the script adapted to determine an ontology for an object-based data modeling framework of the data analysis platform.

19. The computer-implemented method of claim 11, further comprising automatically applying promotions to the data platform objects corresponding to the temporary objects upon promotions being applied to the temporary objects.

20. The computer-implemented method of claim 19, further comprising storing metadata describing the promotions applied to the temporary object.

\* \* \* \* \*